US012657543B2

(12) United States Patent
Ramesh et al.

(10) Patent No.: US 12,657,543 B2
(45) Date of Patent: Jun. 16, 2026

(54) FLEET-SPECIFIC PERFORMANCE IMPACT OF VEHICLE CONFIGURATION

(71) Applicant: PACCAR Inc, Bellevue, WA (US)

(72) Inventors: Varun Ramesh, Bellingham, WA (US); Carl Hergart, Bellingham, WA (US); Cynthia Chaffin Webb, Sedro-Woolley, WA (US); Jorge Rafael Lozada Ramirez, Cerrada del Sol (MX)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 17/239,072

(22) Filed: Apr. 23, 2021

(65) Prior Publication Data

US 2021/0334727 A1 Oct. 28, 2021

Related U.S. Application Data

(60) Provisional application No. 63/015,648, filed on Apr. 26, 2020.

(51) Int. Cl.
*G06Q 10/0639* (2023.01)
*G07C 5/02* (2006.01)

(52) U.S. Cl.
CPC ......... *G06Q 10/06393* (2013.01); *G07C 5/02* (2013.01)

(58) Field of Classification Search
None
See application file for complete search history.

(56) References Cited

U.S. PATENT DOCUMENTS

| | | | | |
|---|---|---|---|---|
| 9,632,502 B1 * | 4/2017 | Levinson | ............... | G08G 1/166 |
| 10,311,527 B2 * | 6/2019 | Pfeiffer | ................. | G06Q 50/02 |

(Continued)

FOREIGN PATENT DOCUMENTS

JP 2020177314 A * 10/2020

OTHER PUBLICATIONS

Netstar "3 KPIs to help benchmark your fleet vehicle telematics data" (2019) (https://www.netstaraustralia.com.au/3-kpis-to-help-benchmark-your-fleet-vehicle-telematics-data/) (Year: 2019).*

(Continued)

*Primary Examiner* — Sujay Koneru
(74) *Attorney, Agent, or Firm* — Merchant & Gould, P.C.

(57) ABSTRACT

Aspects of systems, method, and computer-readable storage media are provided that determine a vehicle configuration based on operator use case-specific performance impacts. A fleet analytics system is deployed as a lightweight, easy-to-use cloud-based service to a non-technical audience. Aspects of the fleet analytics system utilize a telematics system to collect and store real-time data from vehicles, a cloud-computing system to provide as a service that can be used by operators/dealers/sales personnel and that has sufficient complexity to analyze telemetry data, generate a dataset of actual (real-world) use case-related metrics that are related to a target operator's use case, compare the actual metrics against the target operator's metrics, determine an estimated impact of a vehicle configuration variable to the target operator based on the operator's specific use case, and generate a vehicle configuration and visualizations based on the estimated performance impact for communicating the estimated performance impact to the operator.

18 Claims, 6 Drawing Sheets

(56) References Cited

U.S. PATENT DOCUMENTS

| | | | | |
|---|---|---|---|---|
| 2006/0047419 A1* | 3/2006 | Diendorf | G06Q 10/08 | 340/552 |
| 2007/0027593 A1* | 2/2007 | Shah | B60W 50/00 | 702/33 |
| 2007/0124189 A1* | 5/2007 | Stoughton | G06Q 10/20 | 705/305 |
| 2007/0239322 A1* | 10/2007 | McQuade | G07C 5/008 | 701/1 |
| 2008/0313110 A1* | 12/2008 | Kreamer | G06Q 10/1097 | 706/14 |
| 2009/0083050 A1* | 3/2009 | Eltman | G06Q 10/06 | 705/305 |
| 2011/0040440 A1* | 2/2011 | de Oliveira | G06Q 10/0631 | 701/29.5 |
| 2012/0162265 A1* | 6/2012 | Heinrich | G06F 3/04883 | 345/173 |
| 2013/0006715 A1* | 1/2013 | Warkentin | G07C 5/0858 | 705/7.38 |
| 2013/0104064 A1* | 4/2013 | McCormick | G07C 5/008 | 715/765 |
| 2013/0164715 A1* | 6/2013 | Hunt | G09B 9/052 | 434/65 |
| 2013/0232027 A1* | 9/2013 | Reich | G06Q 30/0631 | 705/26.7 |
| 2014/0052672 A1* | 2/2014 | Wagner | G06Q 10/06398 | 705/500 |
| 2014/0358645 A1* | 12/2014 | Ehrman | G06Q 10/06393 | 705/7.39 |
| 2015/0081162 A1* | 3/2015 | Mitchell | G06Q 10/08 | 701/32.4 |
| 2015/0193994 A1* | 7/2015 | Mcquade | G07C 5/008 | 701/29.3 |
| 2015/0199775 A1 | 7/2015 | Pfeiffer et al. | | |
| 2016/0078576 A1* | 3/2016 | Su | G06Q 10/0631 | 705/7.12 |
| 2016/0371553 A1* | 12/2016 | Farnham, IV | G08G 1/04 | |
| 2017/0123421 A1* | 5/2017 | Kentley | G01C 21/26 | |
| 2018/0158145 A1* | 6/2018 | Weigel | G06Q 40/06 | |
| 2018/0300968 A1* | 10/2018 | Kutkut | G07C 5/008 | |
| 2019/0082287 A1* | 3/2019 | Froehlich | H04B 17/27 | |
| 2019/0197430 A1* | 6/2019 | Arditi | G06N 20/00 | |
| 2019/0197798 A1* | 6/2019 | Abari | G06Q 10/02 | |
| 2019/0318248 A1* | 10/2019 | Moreira-Matias | G06N 20/20 | |
| 2019/0340543 A1* | 11/2019 | Gerenstein | G08G 1/202 | |
| 2020/0019926 A1* | 1/2020 | Ayoub | G06Q 10/083 | |
| 2020/0031364 A1* | 1/2020 | Payne | B60W 50/0097 | |
| 2020/0033147 A1* | 1/2020 | Ahn | G01C 21/3461 | |
| 2020/0173412 A1* | 6/2020 | Meroux | G06Q 30/0283 | |
| 2020/0391755 A1* | 12/2020 | Lerner | G06N 20/20 | |
| 2021/0049833 A1* | 2/2021 | Bielby | G06N 3/063 | |
| 2021/0279632 A1* | 9/2021 | Di Pietro | G06N 20/00 | |

OTHER PUBLICATIONS

European Extended Search Report in Application 21170535.5, mailed Sep. 27, 2021, 8 pages.

* cited by examiner

Fleet Analytics System 100

Back End

Performance Impact-Based Vehicle Configuration System 110

112

Client Computing Device 102

Front End

Client Application 104

Network 108

Data Source(s) 114

Provisioning System 118

Vehicle Manufacturing System 120

FLEET-SPECIFIC PERFORMANCE IMPACT OF VEHICLE CONFIGURATION

CROSS-REFERENCE TO RELATED APPLICATIONS

This application claims the benefit of U.S. Provisional Application No. 63/015,648, having the title of "FLEET-SPECIFIC PERFORMANCE IMPACT OF VEHICLE CONFIGURATION" and the filing date of Apr. 26, 2020, which application is hereby incorporated herein by reference in its entirety.

BACKGROUND

Key performance metrics based on real-world data can help equip a vehicle sales team, dealer, or operator with information needed to determine an estimated performance benefit associated with implementation of a particular vehicle configuration in a vehicle or a fleet of vehicles.

It is with respect to these and other general considerations that embodiments have been described. While relatively specific problems have been discussed, it should be understood that the embodiments should not be limited to solving the specific problems identified in the background.

SUMMARY

The disclosure generally relates to systems, methods, and computer readable storage media for providing a vehicle configuration based on operator use case-specific performance impacts. A fleet analytics system described herein is designed to be easy to deploy as a lightweight, easy to use cloud-based service. Aspects of the fleet analytics system utilize a telematics system to collect and store real-time data from vehicles, a cloud-computing system to provide as a service that can be used by operators/dealers/sales personnel and that has sufficient complexity to analyze telemetry data, generate a dataset of actual (e.g., real-world) use case-related metrics that are related to a target operator's use case, compare the actual metrics against the target operator's metrics, determine an estimated impact of a vehicle configuration variable to the target operator based on the operator's specific use case, and generate a vehicle configuration based on the estimated performance impact and visualizations for communicating the estimated performance impact to the operator in a clear manner from which the operator is able to draw business insights and take action for improving performance.

In a first aspect, a system for providing a vehicle configuration based on operator use case-specific performance impacts is provided. In an example embodiment, the system comprises at least one processor, a memory storage device including instructions that when executed by the at least one processor are configured to: obtain telemetry data for a target operator, the telemetry data including metrics characteristics of the target operator's drive cycle; mine a data source for other operator telemetry data relevant to the target operator's drive cycle; determine key performance indicators (KPIs) based on the target operator's telemetry data and the other operator telemetry data; analyze the KPIs for estimating a target operator-specific performance impact associated with an implementation of a vehicle configuration; determine a vehicle configuration based on the estimated target operator-specific performance impact; and provide the vehicle configuration and the estimated target operator-specific performance impact to a client application.

In another aspect, a method for providing a vehicle configuration based on operator use case-specific performance impacts is provided. In an example embodiment, the method comprises: obtaining telemetry data for a target operator, the telemetry data including metrics characteristics of the target operator's drive cycle; mining a data source for other operator telemetry data relevant to the target operator's drive cycle; determining key performance indicators (KPIs), based on the target operator's telemetry data and the other operator telemetry data; analyzing the KPIs for estimating a target operator-specific performance impact associated with an implementation of a vehicle configuration; determining a vehicle configuration based on the estimated target operator-specific performance impact; and providing the vehicle configuration and the estimated target operator-specific performance impact to a client application.

In another aspect, a computer-readable storage device is provided, the computer-readable storage device including computer readable instructions, which when executed by a processing unit, are configured to: obtain telemetry data for a target operator, the telemetry data including metrics characteristics of the target operator's drive cycle; mine a data source for other operator telemetry data relevant to the target operator's drive cycle; determine key performance indicators (KPIs), based on the target operator's telemetry data and the other operator telemetry data; analyze the KPIs for estimating a target operator-specific performance impact associated with an implementation of a vehicle configuration; determine a vehicle configuration based on the estimated target operator-specific performance impact; and provide the vehicle configuration and the estimated target operator-specific performance impact to a client application.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Figure 1:
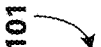
FIG. 1 is a block diagram of an example environment in which a fleet analytics system of the present disclosure can be implemented according to an embodiment.

Aspects of the present disclosure are generally directed to systems, methods and computer readable storage media for providing a vehicle configuration based on operator use case-specific performance impacts. The detailed description set forth below in connection with the appended drawings is an illustrative and non-limiting description of various embodiments of the disclosed subject matter. Wherever possible, the same reference numbers are used in the drawings and the following description to refer to the same or similar elements. In the following description, numerous specific details are set forth in order to provide a thorough understanding of illustrative embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein. The illustrative examples provided herein are not intended to be exhaustive or to limit the claimed subject matter to the precise forms disclosed.

While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

The following description proceeds with reference to examples of systems and methods suitable for use in vehicles, such as Class 8 trucks. Although illustrative embodiments of the present disclosure will be described hereinafter with reference to vehicles, it will be appreciated that aspects of the present disclosure have wide application, and therefore, may be suitable for use with many types of vehicles, such as trucks, passenger vehicles, buses, commercial vehicles, light and medium duty vehicles, etc.

Prior attempts to determine an estimate of a key performance metric based on real-world data may rely on extensive powertrain test data over representative cycles (H DCC cycles). These methods may assume the vehicle and driver to have negligible effect and may use artificial drive cycles that are different from operator-specific use cases. For example, deviations may result between powertrain tests and results measured in the real world (e.g., based on collected telemetry data), including the effects of the vehicle, operating route, and the driver.

On the other extreme, other prior attempts may rely on complex simulations to capture the effect of drive cycles. The tools to perform these simulations are computationally and storage expensive and may require a highly skilled user to run and draw meaningful conclusions. This makes it cost-prohibitive for most vehicle fleets, and may be prohibitive to being profitable for a company to perform on a per-vehicle basis. Further, these simulations typically require powerful computers that are difficult to maintain by the dealer. Other key challenges may include data security, cost-efficient storage, and data throughput and processing capability, which limit the ability to deploy at the operator/dealer/sales level.

FIG. 1 is a block diagram of an example environment 101 in which a fleet analytics system 100 of the present disclosure can be implemented. For example, the example environment 101 may include a client computing device 102, a network 108, a plurality of data sources 114, and one or more servers 112. Communications between the client computing device 102, the data sources 114, and the server(s) 112 are carried out over the network 108 using well-known network communication protocols. For example, the network 108 may be one or a wide area network (e.g., the Internet), a local area network, another type of network, or a combination thereof.

The client computing device 102 may be one or more of various types of computing devices (e.g., a server device, a desktop computer, a tablet computing device, a mobile device, a laptop computer, a laptop/tablet hybrid computing device, a large screen multi-touch display, or other type of computing device) configured to execute instructions for performing a variety of tasks. The hardware of these computing devices is discussed in greater detail in regard to FIG. 5. The client computing device 102 is shown to include a front end client application 104. A user may use the client application 104 to input target operator information and/or obtain target operator information from a data source 114, and to initiate a request to a performance impact-based vehicle configuration system 110 (herein referred to as a vehicle configuration system 110) operating on a server 112 for providing a recommended vehicle configuration based on operator use case-specific performance impacts. For example, the user may be an existing operator of a dealer or manufacturer of vehicles or the dealer or manufacturer, and the fleet analytics system 100 may be used to provide a user-friendly front end client application 104 with which the user may interface, and a back end analytics and visualization system (i.e., the vehicle configuration system 110) that is deployed on the cloud and offered as a service to mine (query) a data source 114 for real-world telemetry data relevant to a target operator's drive cycle, analyze key performance indicators (KPIs) based on implementation of a vehicle configuration variable, estimate an impact of the vehicle configuration variable on the target operator's performance, and determine a recommendation based on the estimated impact.

The client application 104 may be configured to provide requests (e.g., hypertext transfer protocol (HTTP) requests) to data sources 114 and servers 112 for requesting information stored on or accessible to, or determined by the data sources 114 and/or servers 112. In some examples, the client application 104 is a thick client application that is stored locally on the client computing device 102. In other examples, the client application 104 is a thin client application (e.g., a web application) that may reside on a remote server and be accessible over the network 108. For example, a thin client application can be hosted in a browser-controlled environment or coded in a browser-supported language and be reliant on a common web browser executing on the client computing device 102 to render the client application 104 executable on the device.

In some examples, the example environment 101 may include a provisioning system 118 and a vehicle manufacturing system 120. For example, the provisioning system 118 is illustrative of a software module, system, or device that is operative or configured to receive an optimal vehicle configuration for a vehicle, as determined by the vehicle configuration system 110, and communicate with the vehicle manufacturing system 120 for initiating manufacture of the vehicle according to the optimal vehicle configuration. In some examples, the provisioning system 118 may be operative to convert vehicle configuration options corresponding to the optimal vehicle configuration (e.g., powertrain configurations, other vehicle configurations/options) into a format that can be utilized by the vehicle manufacturing system 120 to initiate manufacture of the vehicle.

The data sources 114 may be or include any suitable data source or data storage server, unit or system, including any applicable applications, e.g., database management system (DBMS) applications, attached storage systems and the like. The data sources 114 are configured to execute instructions that provide information to the fleet analytics system 100. For example, a data source 114 may receive a request for stored data from the client computing device 102 and/or from back end modules of the fleet analytics system 100.

The server(s) 112 are illustrative of physical or virtual processing systems that are configured to execute instructions that analyze data and provide information to the client computing device 102 and in response to receiving requests from the client computing device 102. For example, the information may include Web pages, output of executables, raw data, or any other suitable type of information. In accordance with some example embodiments, the server(s) 112 are configured to host respective Web sites, so that the Web sites are accessible to users of the fleet analytics system 100. The server(s) 112 are shown to include a backend vehicle configuration system 110. The vehicle configuration system 110 is illustrative of a software module, system, or device that is operative or configured to mine a data source 114 for real-world telemetry data relevant to a target operator's drive cycle, analyze key performance indicators (KPIs) based on implementation of a vehicle configuration variable, estimate an impact of the vehicle configuration variable on the target operator's performance, and determine a vehicle configuration based on the estimated impact. In some examples, the vehicle configuration variable may include one or a combination of: truck model, engine variants, aero-features, powertrain components (e.g., engine, transmissions (hardware and software), axle ratio), technologies associated with advanced driver-assistance systems (ADAS) (e.g., predictive cruise control (PCC), adaptive cruise control (ACC), cruise control (CC)), idle reduction (IR) equipment), and other technologies and hardware components. An example technique for providing a vehicle configuration based on operator use case-specific performance impacts is discussed in greater detail below with reference to FIGS. 2-4.

Figure 2A:
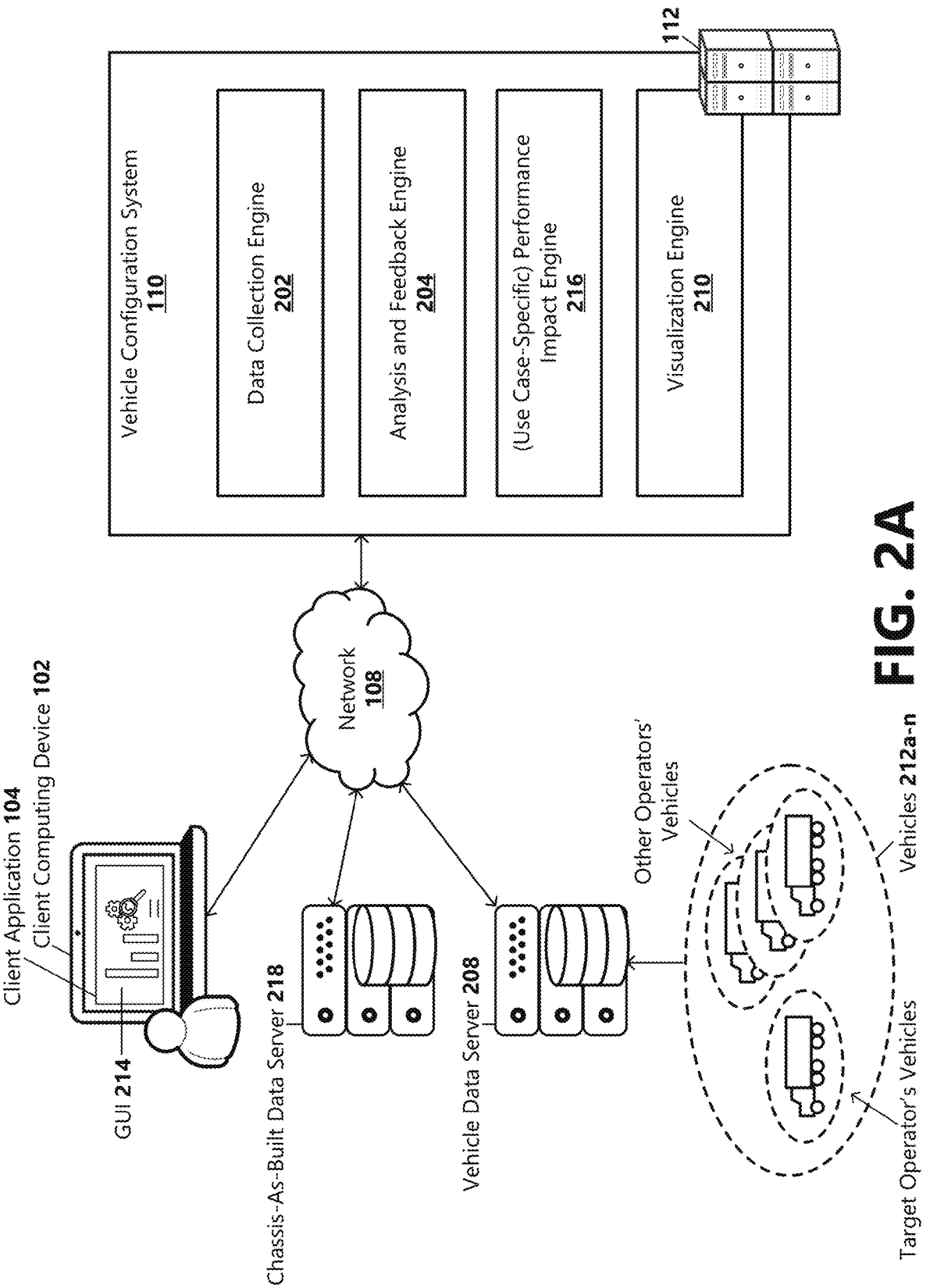
FIGS. 2A and 2B are block diagrams illustrating components of the example fleet analytics system of FIG. 1.
Figure 2B:
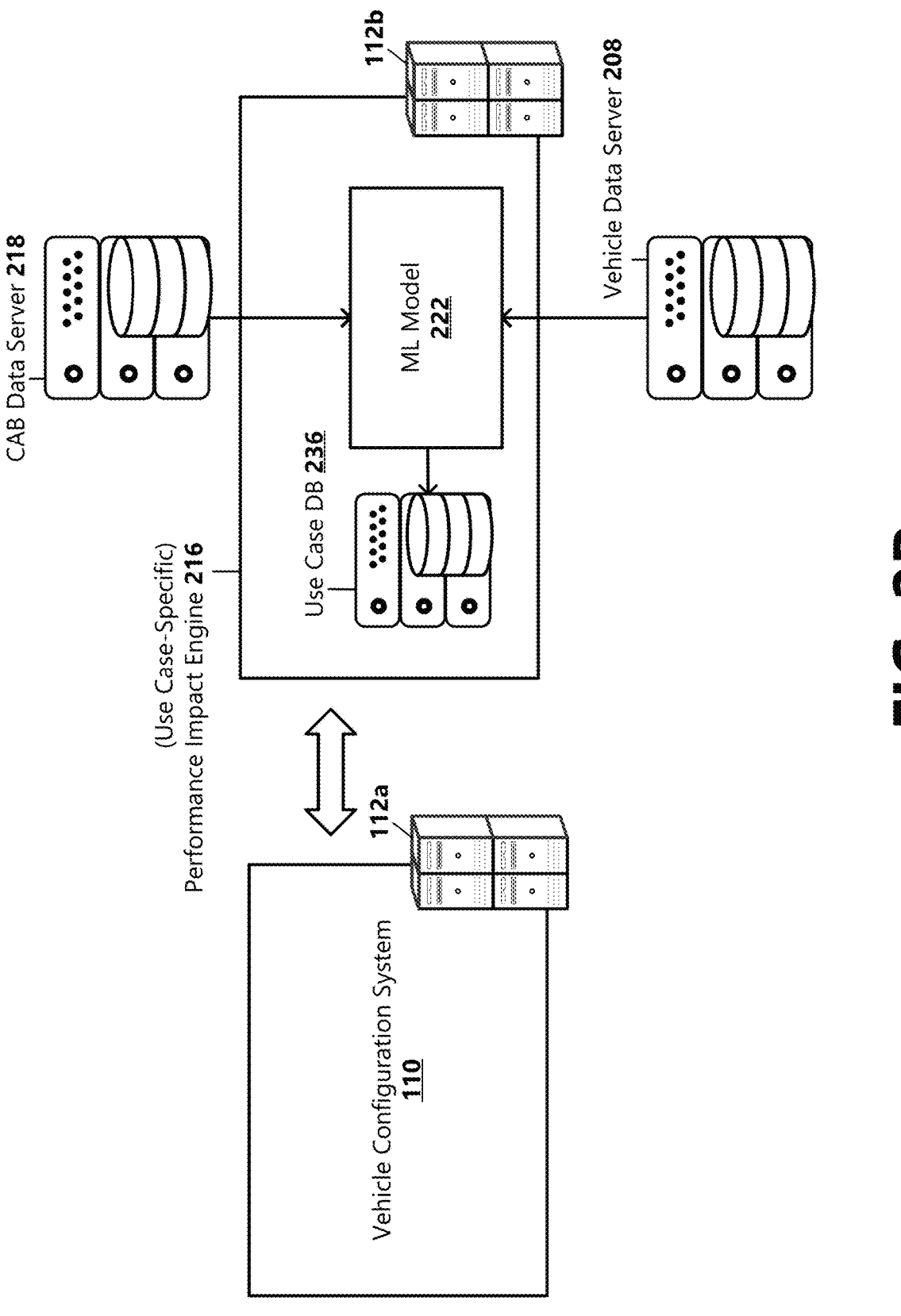

FIGS. 2A-B are block diagrams that illustrate components of an example fleet analytics system 200. A user may use the client application 104 to initiate a request for a vehicle configuration based on target operator use case-specific performance impacts from the vehicle configuration system 110. According to examples, the client application 104 may provide a graphical user interface (GUI) 214 that allows the user to initiate the request for a vehicle configuration based on target operator use case-specific performance impacts and to view a dashboard comprising the vehicle configuration and associated target operator use case-specific performance impacts and other information, and to otherwise interact with functionalities of the fleet analytics system 100 through manipulation of graphical icons, visual indicators, and the like. In addition, a target vehicle configuration may be received, e.g., through client application 104. For example, a user may input a potential engine, transmission, or other powertrain or vehicle option for which the operator is interested in determining the potential impact on its operations.

As used herein, the term 'use case' describes a drive cycle of an operator's vehicle 212 or fleet of vehicles. For example, a target operator's drive cycle may be defined by key metrics that are characteristic of the target operator's drive cycles, including, but not limited to, average speed, maximum speed, kinetic intensity, trip distance, vehicle class, typical or intended route data (e.g., GPS information), etc. Actual other operator use case data that may be relevant to the target operator's drive cycle may be defined by key metrics that are characteristic of drive cycles of other operators that are similar to the target operator's drive cycles. The key metrics that are characteristic of the operators' drive cycles may include various telemetry data stored in a vehicle data server 208.

The vehicle data server 208 may be a real-time database operative or configured to collect and store telematics data from a population of operators' vehicles 212*a-n* (generally 212). For example, the collected and stored telematics data can include trip data, faults snapshot data, location and ambient conditions data, drive cycle data (e.g., speed (maximum, average), throttle, idle, power take off (PTO), cruise), various performance variables, fuel consumption data, route data, and other that may be sensed by a vehicle's onboard sensors and sent to, received by, and stored on the vehicle data server 208. For example, telemetry data and other diagnostics data captured during normal real-world vehicle operation, such as that collected and stored by the vehicle data server 208, may provide an accurate characterization of vehicle usage and performance, and are therefore advantageous for use in determining other operators with similar drive cycles and for use in determining how well a vehicle 212 or fleet of vehicles 212 may be performing in comparison against the other operators with similar drive cycles.

The telemetry data may be collected using various technologies, such as via a dedicated onboard vehicle tracking device installed in a vehicle 212 that allows the sending, receiving and storing of telemetry data. In some examples, the device may be configured to connect via the vehicle's onboard diagnostics (ODBII), CAN (Controller Area Network) bus port, or other technology with a SIM card, and an onboard modem may enable communication through a wireless network 108. In some examples, the telemetry data may be transmitted via GPRS (General Packet Radio Service), a mobile data and cellular network, or satellite communication to the vehicle data server 208. In other examples, the operational/telematics data may be too large to be conveniently transmitted during operation and may be retrieved via wired, wireless, or other communications means when the vehicle(s) is/are present at a dealer or operator-care site (e.g., by reading such data from disk or other tangible storage means provided in the vehicle(s)). In some examples, the vehicle data server 208 may be configured to process and convert the collected telemetry data into a database of telemetry data, where the data are stored and can be accessed by data requesters, such as the vehicle configuration system 110 and, in some examples, the client application 104. According to an aspect, the received telemetry data may be anonymized.

As used herein, the term 'vehicle configuration' describes one or a combination of vehicle configuration variants/options of a vehicle 212 or a fleet of vehicles, such as, but not limited to: truck model, engine variants, aero-features, powertrain components (e.g., engine, transmissions (hardware and software), axle ratio), technologies associated with advanced driver-assistance systems (ADAS) (e.g., predictive cruise control (PCC), adaptive cruise control (ACC), cruise control (CC)), idle reduction (IR) equipment), and other technologies and hardware components etc. For example, vehicle configuration options may be selectable by an operator when purchasing a vehicle 212 or, in some examples, when modifying a vehicle. According to an aspect, different combinations of vehicle configuration options may result in different KPIs that may be indicative of how well an operator's vehicle 212 or fleet of vehicles 212 may be comparatively performing. For improved performance in association with a KPI, it is useful for a target operator to receive a vehicle configuration that is relevant to the target operator based on use case (e.g., drive cycle) and information informing the target operator about target operator use case-specific performance impacts. Data associated with operators' vehicle configurations may be stored in a Chassis-As-Built (CAB) server 218.

According to an aspect, the CAB data server 218 may be a static database configured to store data associated with how a vehicle 212 is configured at the time of build, which may include powertrain specification options (e.g., engine type, a hardware/software transmission type, and an axle ratio) and other specification options and technologies that may be offered for implementation in a vehicle configuration. The data collection engine 202 may be further configured to communicate with the CAB data server 218 for requesting vehicle configuration data for a target operator and for other operators who have similar drive cycles. In response to a query for vehicle configuration data (e.g., from the data collection engine), the CAB data server 218 may provide the requested vehicle configuration data to the vehicle configuration system 110. According to an aspect, the received vehicle configuration data may be anonymized. As should be appreciated, while the vehicle data server 208 and the CAB data server 218 are shown to be included in separate servers 112 (or respective groups of servers), however, in other examples, the vehicle data server 208 and the CAB data server 218 may be included in a common server 112.

As part of using the client application 104 to initiate the request for a vehicle configuration and associated target operator use case-specific performance impacts, the user may input operator information. For example, the operator information may include identifier information for the target operator that can be used to obtain data (e.g., vehicle configuration data and drive cycle data) for the target operator. In some examples, the GUI 214 may include a webpage or an application interface visible to the user. For example, the GUI 214 may be displayed on a screen included in or operatively connected to the client computing device 102. In some examples, the GUI 214 may be configured to utilize natural interface technologies that enable a user to interact with functions of the fleet analytics system 100 and data provided by the fleet analytics system 100 in a "natural" manner (e.g., methods that may rely on speech recognition, touch and stylus recognition, gesture recognition both on screen and adjacent to the screen, air gestures, head and eye tracking, voice and speech, vision, touch, hover, gestures).

According to an aspect and with reference still to FIG. 2A, the vehicle configuration system 110 may include or be operatively connected to various components including a data collection engine 202, an analysis and feedback engine 204, a performance impact engine 216, and a visualization engine 210. As should be appreciated, while the various components are shown to be included in a common server 112 (or a common group of servers), the various components (or any respective combinations or portions thereof) may be included in separate servers (or respective groups of servers). An example of this is illustrated in FIG. 2B and described below. The data collection engine 202 is illustrative of a software module, system, or device that is operative or configured to receive data from the client application 104, such as the request for a vehicle configuration and associated operator information, and other data input and selected via the GUI 214, and to process selections made by the user.

The analysis and feedback engine 204 is illustrative of a software module, system, or device that is operative or configured to analyze (e.g., perform calculations on) operator information received via the data collection engine 202 and provide feedback related to a determined vehicle configuration and associated performance improvement information. According to an aspect, the analysis and feedback engine 204 is further configured to use the performance impact engine 216 to determine the vehicle configuration and associated performance improvements for a target operator.

The performance impact engine 216 is illustrative of a software module, system, or device that is operative or configured to determine, for a target operator, the target operator's drive cycle, variations in vehicle configurations between the target operator's vehicle 212 or fleet of vehicles 212 and the vehicle configurations of other operators whose drive cycles are similar to the target user's drive cycle, variations in KPIs associated with the variations in vehicle configurations, and a vehicle configuration that improves the target operator's KPIs.

According to an aspect, the performance impact engine 216 may be configured to receive or obtain target operator drive cycle data. In some examples, the target operator drive cycle data may be input by a user via a selection or input of various drive cycle key metric values provided in the GUI 214. For example, the user may input/select drive cycle key metric values defining attributes that represent the target operator's drive cycle or a potential drive cycle. According to an aspect, the GUI 214 may include user interface controls that enable the user to input or select various drive cycle key metric values associated with an average speed, maximum speed, kinetic intensity, trip distance, vehicle class, etc. User inputs associated with inputs/selections of drive cycle key metric values may be received by the data collection engine 202 and communicated with the performance impact engine 216 via the analysis and feedback engine 204. In other examples, the target operator drive cycle data may be retrieved from the vehicle data server 208. For example, the performance impact engine 216 may be configured to retrieve various drive cycle data associated with the target operator's vehicle 212 or a fleet of vehicles 212 from a data source 114 embodied as the vehicle data server 208.

According to an aspect, the performance impact engine 216 may be further configured to analyze the target operator's drive cycle data for determining and assigning values to various drive cycle key metrics that may characterize the drive cycle of the target operator (e.g., average speed, maximum speed, kinetic intensity, trip distance, vehicle class, etc.). As should be appreciated, other drive cycle key metric values may be determined for and used to characterize the drive cycle of operators' vehicles 212.

According to an aspect, the performance impact engine 216 may be further configured to request telemetry data associated with various KPIs that can be compared for determining a target operator's comparative performance. For example, the KPIs may be indicative of how well an operator's vehicle 212 or fleet of vehicles 212 may be comparatively performing against other operators with similar drive cycles/use cases, and can include, but are not limited to, fuel economy, software status, uptime, gradeability, acceleration, freight efficiency, maintenance compliance, or other transportation system efficiency attribute metrics. In some examples, KPIs may additionally include performance measurements associated with the driver(s) of the vehicle(s) 212. The telemetry data requested/mined from the vehicle data server 208 include telemetry data associated with the calculating the various KPIs.

The performance impact engine 216 may be further configured to use the target operator's drive cycle key metric values to mine the vehicle data store 208 for telemetry data of operators who have drive cycle key metric values that are related to (e.g., similar to within a threshold) the target operator's drive cycle key metric values. In some examples, target operator's drive cycle key metric values may be configurable by the user. For example, the user may adjust the drive cycle key metric values and/or threshold values based on the operator's preferences or desires, or to otherwise better represent the target operator's vehicle 212 or fleet of vehicles 212. For example, the GUI 214 may include user interface controls that enable the user to adjust the drive cycle key metric values and/or threshold values that are used to mine the vehicle data store 408 for telemetry data of similar use-case operators.

According to an aspect, the performance impact engine 216 may be further configured to analyze the telemetry data for determining one or more KPIs for the target operator and for the operators who have similar drive cycles. The performance impact engine 216 may be further configured to determine how the target operator may be comparatively performing by benchmarking the KPIs of the target operator against the KPIs determined for the operators with similar drive cycles. Benchmarking results may include KPI values and associated metrics and differences in KPI values. For example, the differences in values between the KPIs of the target operator and the operators with similar drive cycles may be indicative of comparative performance, wherein target operator KPI values that are lower than the similar drive cycles operators' KPI values (e.g., according to a threshold value) may indicate lower performance, target operator KPI values that are higher than similar drive cycles operators' KPI values (e.g., according to a threshold value) may indicate higher performance, and target operator KPI values that are approximate to similar drive cycles operators' KPI values (e.g., according to a threshold value) may indicate average performance. For example, benchmarking results may be used to identify underperforming vehicles 212, identify vehicle drivers who may need coaching/instruction, and/or identify how the target operator compares against other operators with similar drive cycles.

According to an aspect, the performance impact engine 216 may be further configured to request vehicle data associated with the target operator's underperforming vehicles 212 and the corresponding vehicle data associated with the other operators' comparatively better performing vehicles from the CAB data server 218. In response, the performance impact engine 216 receive results including vehicle configuration data defining how the target operator's underperforming vehicles 212 and the comparatively better performing vehicles are configured (e.g., truck model, engine variants, aero-features, powertrain components (e.g., engine, transmissions (hardware and software), axle ratio), technologies associated with advanced driver-assistance systems (ADAS) (e.g., predictive cruise control (PCC), adaptive cruise control (ACC), cruise control (CC)), idle reduction (IR) equipment), and other technologies and hardware components).

The performance impact engine 216 may be further configured to analyze the KPIs in association with the vehicle configuration data for determining correlations between performance and a vehicle configuration based on other operator use case-related data. For example, the performance impact engine 216 may be configured to identify particular vehicle configuration options that can improve one or more of the target operator's KPIs, estimate a performance impact associated with implementing a particular vehicle configuration option, and in some examples, and the costs and potential realized cost savings associated with implementing one or more of the vehicle configuration variants/options. Vehicle configuration options that may improve one or more of the target operator's KPIs may be determined as vehicle configurations for the target operator.

The visualization engine 206 is illustrative of a software module, system, or device that is operative or configured to generate and provide a dashboard UI to the client application 104 to be rendered in a GUI 214 and displayed by the client computing device 102. For example, the dashboard UI may include various visualizations representing performance data associated with vehicle configurations. In some examples, the visualizations may represent a comparison between the vehicle configurations and associated KPIs of the target operator and the vehicle configurations and associated KPIs of operators who have similar drive cycles as the target operator. The visualizations may indicate a comparatively low KPI and the vehicle configuration that may be determined to be associated with the low KPI. The user/operator may be enabled to view the various visualizations and interact with various options that may allow for a drilldown into the low KPI and into the vehicle configuration that may be determined to be associated with the low KPI in comparison with a vehicle configuration that may be determined to be associated with a comparatively higher KPI given the same drive cycle. According to an aspect, the visualizations may include a vehicle configuration for the target operator, wherein the vehicle configuration may be associated with a comparatively higher KPI given the same drive cycle. In some examples, the visualizations may further include an estimated performance impact associated with implementing the vehicle configuration.

As illustrated in FIG. 2B, in some examples, the performance impact engine 216 may include an unsupervised machine learning model 222 that may be configured to run in the backend continuously and perform analyses on various telemetry data, drive cycle data, vehicle configurations, and KPIs to build a use case database 236 comprising relationships between the various telemetry data, drive cycle data, vehicle configurations, and KPIs. For example, performance impact engine 216 may aggregate telemetry data, drive cycle data, vehicle configurations, and KPIs from multiple operators. In this manner, the vehicle data server 208 may comprise a robust set of data across a variety of operators having widely different routes, vehicle configurations, and typical drive cycles. This data can, in examples, also be normalized into a consistent array of data for input into the ML model 222 to permit ML model 222 to use AI/ML techniques to produce the use case database 236. Accordingly, operators may be clustered by drive cycle, and vehicle configurations for various drive cycles may be determined automatically without supervision. A visual display of the vehicle configurations may be executed when requested by a client application 104. Accordingly, the latency for the user may be low.

Among other things, the unsupervised machine learning algorithm used to produce the machine learning model 222 can determine similarities between operators based on all information available in vehicle data server 208 rather than the discrete variables made available to within the client application 104. As information about the target operator and other operators is continuously received/updated in vehicle data server 208, such an unsupervised learning algorithm may be run continuously in the background, while visual display of results for a particular target operator may be displayed only when requested.

In examples, the vehicle configuration system 110 may operate on a cloud server 112 that is accessible to the client computing device 102, and the CAB data server 118 and vehicle data server 108 may operate in a cloud storage environment that is accessible to the vehicle configuration system 110. According to an aspect, the vehicle configuration system 110 may be scalable and may be periodically updated by an OEM. For example, the lightweight client application 104 may be instantiated on computing systems of an operator or dealer, and the vehicle configuration system 110, CAB data server 118, and remote diagnostics server 108 may be instantiated on computing systems of a vehicle manufacturer, as the telematics and analytics systems may be comparatively resource/storage-intensive.

Figure 3:
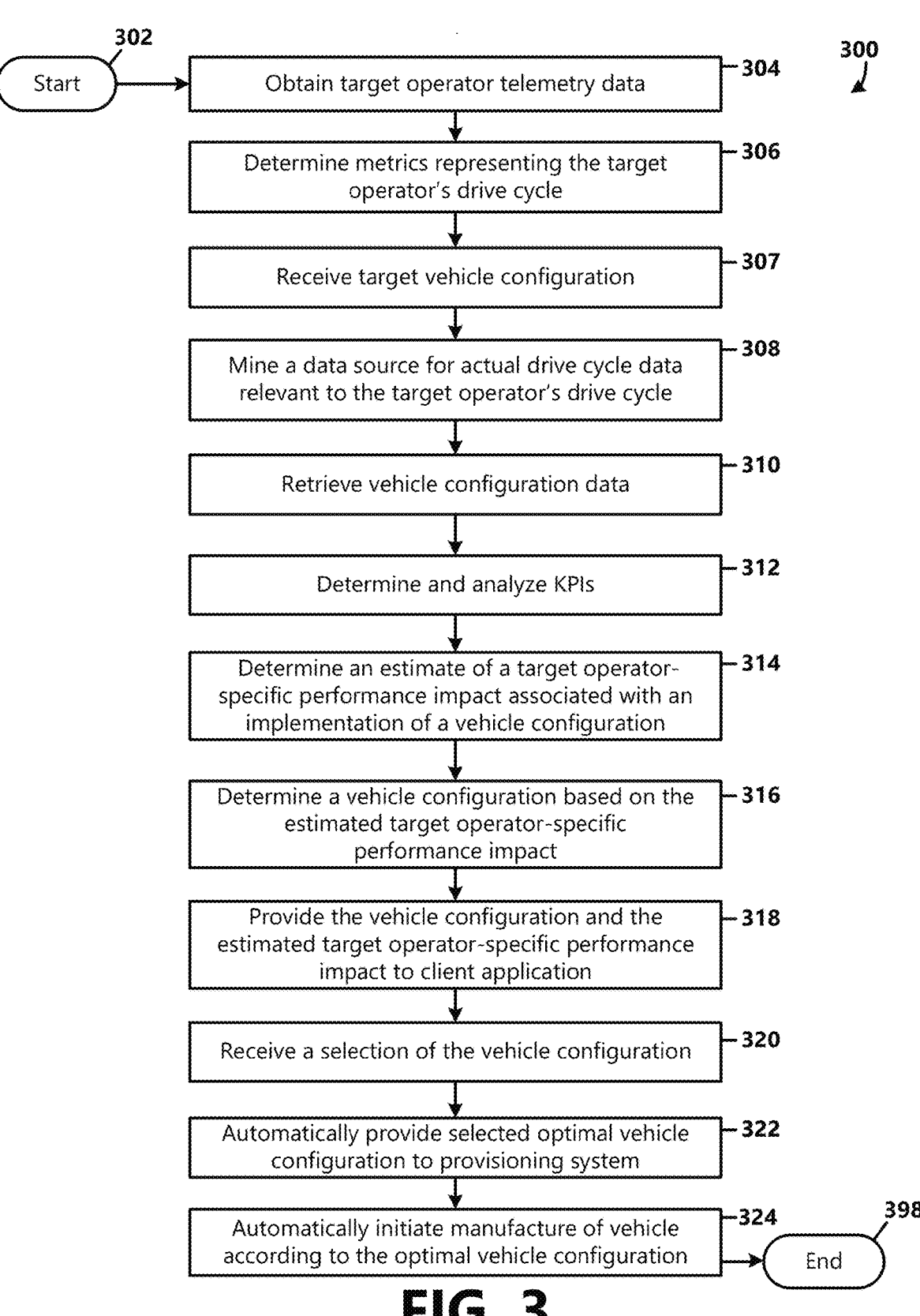
FIG. 3 is a flow diagram depicting general stages of an example process for providing a vehicle configuration based on operator use case-specific performance impacts.

FIG. 3 is a flow diagram depicting general stages of an example method 300 for providing a vehicle configuration based on operator use case-specific performance impacts. The method 300 starts at START OPERATION 302, where a request for a vehicle configuration based on a target operator's unique use case may be initiated via a client application 104. At OPERATION 304, telemetry data associated with the target operator's drive cycle may be received from a user input or obtained from a vehicle data server 208. At OPERATION 306, the drive cycle data may be analyzed for determining metrics representing the target operator's drive cycle. At OPERATION 307 a target vehicle configuration may be received, e.g., through client application 104. For example, a user may input a potential engine, transmission, or other powertrain or vehicle option for which the operator is interested in determining the potential impact on its operations. At OPERATION 308, using the determined metrics, the vehicle data server 208 may be mined for telemetry data of operators who have drive cycles similar to the target operator's drive cycle. For example, if an operator has entered a target vehicle configuration that indicates an interest in testing the impact of a new engine, that information may be used as a filter to mine data at OPERATION 308. Additionally, the telemetry data may be anonymized. At OPERATION 310, vehicle configuration data associated with the target operator's vehicles and the vehicle configuration data of vehicles of the operators who have drive cycles similar to the target operator's drive cycle. At OPERATION 312, various KPIs may be determined and analyzed for determining correlations between vehicle configurations and KPIs. At OPERATION 314, a vehicle configuration may be determined to positively impact the performance of the target operator, and an estimate of the impact may be determined based on real-world like-operator data. At OPERATION 316, a vehicle configuration may be determined, and at OPERATION 318, the vehicle configuration and the estimated target operator-specific performance impact may be provided to the client application 104 for display to the user.

At OPERATION 320, the vehicle configuration may be selected. In some examples, when a plurality of vehicle configurations is determined and provided, the client application 104 may receive a selection of an option provided by the client application 104 for a preferred vehicle configuration. In other examples, the vehicle configuration may be automatically selected. For example, if one optimal vehicle configuration is determined and provided, the one optimal vehicle configuration may be selected. In another example, if a plurality of optimal vehicle configurations is provided in a ranked list, the client application 104 may select a top-ranking vehicle configuration as the vehicle configuration.

At OPERATION 322, the selected vehicle configuration may be automatically provided to the provisioning system 118, and at OPERATION 324, the manufacture of a vehicle 212 may be automatically initiated according to the vehicle configuration. For example, the vehicle manufacturing system 120 may use the vehicle configuration to manufacture a vehicle 212 that is determined to positively impact the performance of the target operator. In examples, the manufacture of the vehicle 212 may be fully automated based on the selected vehicle configuration. The method 300 may end at OPERATION 398.

In some examples, one or more of OPERATIONS 306, 307, 308, 310, and 312 can be collapsed and performed by an unsupervised learning algorithm. For example, the machine learning model 222 and the identification of use cases stored in use case database 236 may effectively be performed by an unsupervised machine learning algorithm using feature selection and principal component analysis to build operator profiles and create associations between vehicle configurations and KPI's based on different use cases. Among other things, the unsupervised machine learning algorithm can determine similarities between use cases and vehicle configurations based on all information available in vehicle data server 208 rather than the discrete variables made available to define potential vehicle configurations within the client application 104. As information about the target operator and other operators is continuously received/updated in vehicle data server 208, such an unsupervised learning algorithm may be run continuously in the background, while visual display of results for a particular target operator may be displayed only when requested.

Figure 4:
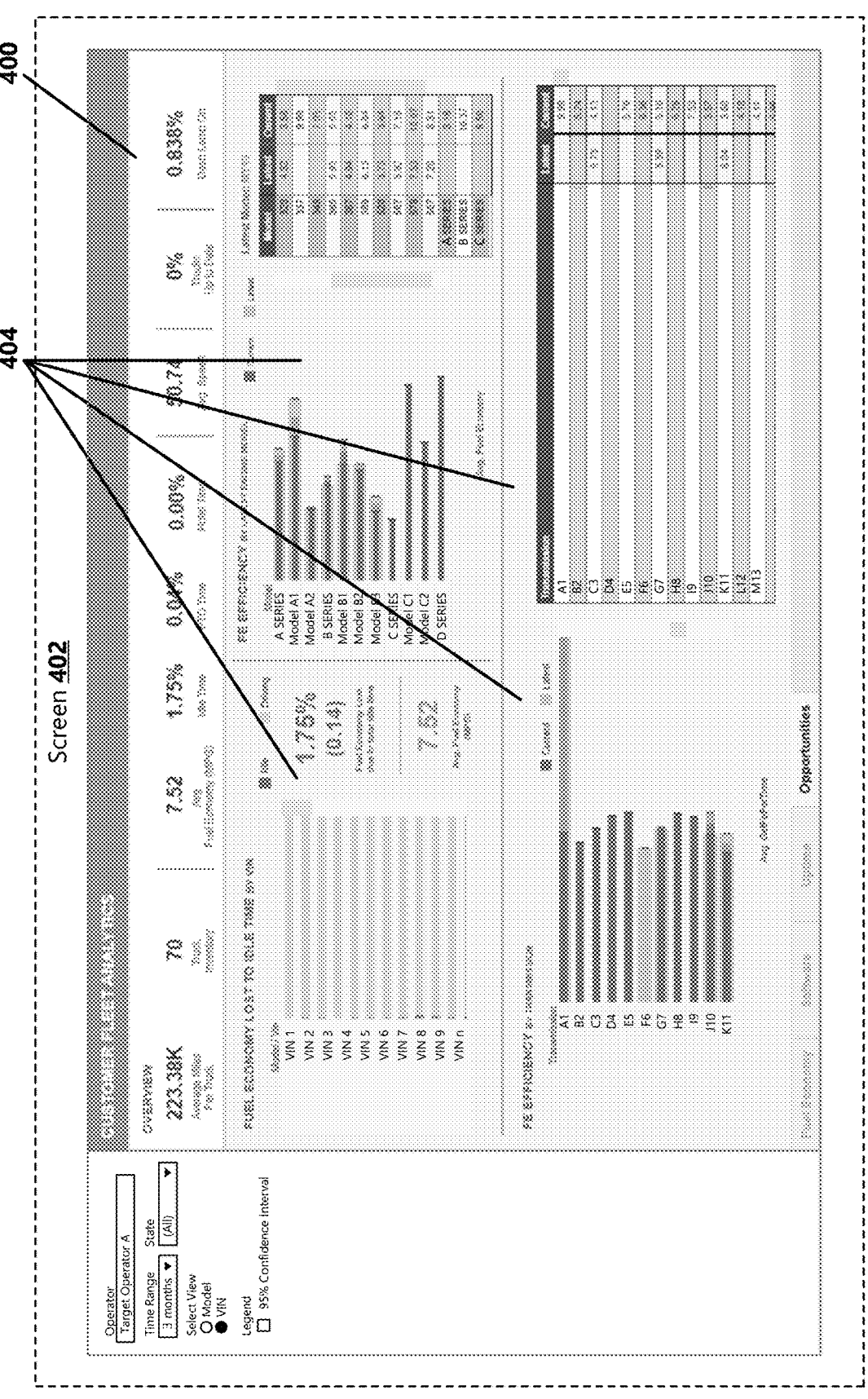
FIG. 4 is an illustration of an example user interface visualization generated by aspects of the present disclosure.

FIG. 4 is an illustration of an example dashboard UI 400 that may be provided to the client application 104 and displayed on a screen 402, wherein the dashboard UI includes example visualizations 404 that may be generated by the visualization engine 210. For example, the example visualizations may indicate an impact of a particular vehicle model and transmission change specific to the target operator's drive cycle. The visualizations may represent an accurate means to enable aftermarket and sales teams to give data-driven vehicle configurations that improve fuel economy and other KPIs specific to the target operator's unique use case. As should be appreciated, the above example UI is intended to be exemplary and not limiting. Other types and configurations of visualizations are possible and are within the scope of the present disclosure.

In examples, the systems and methods described in this application produce multiple technical improvements. For example, rather than relying on complex simulations (which are computationally and storage expensive and may require a highly skilled user to run and draw meaningful conclusions) to capture the effect of operator drive cycles, aspects of the present disclosure use a cloud computing system to obtain telemetry data, diagnostics data, operator vehicle configuration data, and other data to determine other operators with similar drive cycles as a target operator's and to compare KPIs between the target operator and the other operators for evaluating an impact of a vehicle configuration based on the target user's specific use case. Moreover, aggregation and normalization of trip data and telematics data from hardware sensors and other physical components of the vehicles transforms the data into usable information for determining vehicle configurations of other vehicles. In examples, when a vehicle configuration is used to provision and manufacture a vehicle with optimized characteristics, such as fuel efficiency, natural resources are saved by ensuring that vehicles optimized for intended use are produced.

Figure 5:
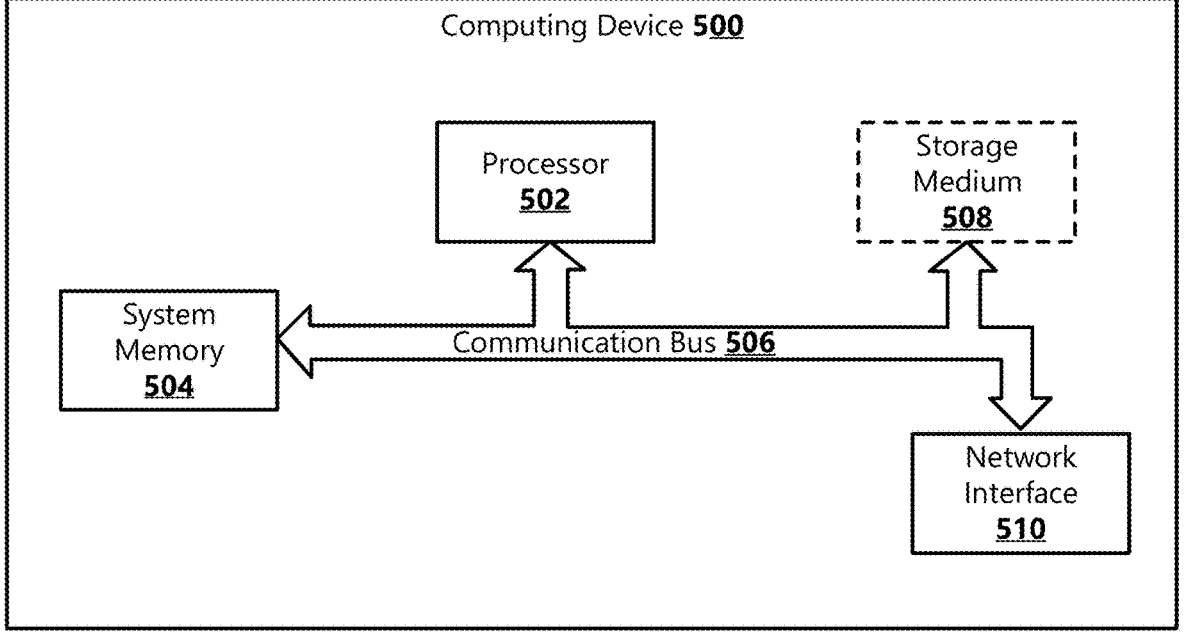
FIG. 5 is a block diagram illustrating example physical components of a computing device or system with which embodiments may be practiced.

FIG. 5 is a block diagram of an illustrative computing device 500 appropriate for use in accordance with embodiments of the present disclosure. The description below is applicable to servers, personal computers, mobile phones, smart phones, tablet computers, embedded computing devices, and other currently available or yet-to-be-developed devices that may be used in accordance with embodiments of the present disclosure.

In its most basic configuration, the computing device 500 includes at least one processor 502 and a system memory 504 connected by a communication bus 506. Depending on the exact configuration and type of device, the system memory 504 may be volatile or nonvolatile memory, such as read-only memory ("ROM"), random access memory ("RAM"), EEPROM, flash memory, or other memory technology. Those of ordinary skill in the art and others will recognize that system memory 504 typically stores data or program modules that are immediately accessible to or currently being operated on by the processor 502. In this regard, the processor 502 may serve as a computational center of the computing device 500 by supporting the execution of instructions.

As further illustrated in FIG. 5, the computing device 500 may include a network interface 510 comprising one or more components for communicating with other devices over a network. Embodiments of the present disclosure may access basic services that utilize the network interface 510 to perform communications using common network protocols. The network interface 510 may also include a wireless network interface configured to communicate via one or more wireless communication protocols, such as WiFi, 2G, 3G, 4G, LTE, WiMAX, Bluetooth, or the like.

In the illustrative embodiment depicted in FIG. 5, the computing device 500 also includes a storage medium 508. However, services may be accessed using a computing device that does not include means for persisting data to a local storage medium. Therefore, the storage medium 508 depicted in FIG. 5 is optional. In any event, the storage medium 508 may be volatile or nonvolatile, removable or non-removable, implemented using any technology capable of storing information such as, but not limited to, a hard drive, solid state drive, CD-ROM, DVD, or other disk storage, magnetic tape, magnetic disk storage, or the like.

As used herein, the term "computer-readable medium" includes volatile and nonvolatile and removable and non-removable media implemented in any method or technology capable of storing information, such as computer-readable instructions, data structures, program modules, or other data. In this regard, the system memory 504 and storage medium 508 depicted in FIG. 5 are examples of computer-readable media.

For ease of illustration and because it is not important for an understanding of the claimed subject matter, FIG. 5 does not show some of the typical components of many computing devices. In this regard, the computing device 500 may include input devices, such as a keyboard, keypad, mouse, trackball, microphone, video camera, touchpad, touchscreen, electronic pen, stylus, or the like. Such input devices may be coupled to the computing device 500 by wired or wireless connections including RF, infrared, serial, parallel, Bluetooth, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computing device 500 (e.g., a client device), or can be integral components of the computing device 500. In some embodiments, multiple input devices may be combined into a single, multifunction input device (e.g., a video camera with an integrated microphone). The computing device 500 may also include output devices such as a display, speakers, printer, etc. The output devices may include video output devices such as a display or touchscreen. The output devices also may include audio output devices such as external speakers or earphones. The output devices can be separate from and communicatively coupled to the computing device 500, or can be integral components of the computing device 500. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a memory or storage medium) or computer storage device and be stored on and executed by one or more general-purpose or special-purpose processors, thus creating a special-purpose computing device configured to provide functionality described herein.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

We claim:

1. A system for providing a vehicle configuration, the system comprising:

at least one processor;

a memory storage device including instructions that when executed by the at least one processor are configured to:

obtain telemetry data for a target operator, the telemetry data including metrics characteristic of the target operator's drive cycle across a fleet of vehicles associated with the target operator;

automatically mine a data source comprising aggregated telemetry data from a plurality of operators for other operator telemetry data, the other operator telemetry data including telemetry data for other operators having metrics within a threshold value of the metrics characteristic of the target operator's drive cycle, wherein the data source includes other operator telemetry data for a plurality of vehicle configurations for a plurality of drive cycles, and wherein mining the data source includes:

identifying operators across a plurality of geographic regions and drive cycle types;

filtering the telemetry data to identify operators having drive cycle characteristics matching the target operator within the threshold value; and extracting vehicle configuration data for vehicles operated by the identified operators;

determine key performance indicators (KPIs) based on the telemetry data for the target operator and the other operator telemetry data, the KPIs being indicative of overall operation of the fleet of vehicles of the target operator and comparative operation of one or more vehicles of the target operator relative to one or more other operators identified as similar to the target operator based on the other operator telemetry data;

using an unsupervised machine-learning model trained using the telemetry data and the other operator telemetry data including vehicle configuration information corresponding to different hardware configurations across the fleet of vehicles, analyze the KPIs for estimating a target operator-specific performance impact associated with an implementation of a vehicle configuration, the vehicle configuration including a plurality of configuration variables indicative of configuration variants of a vehicle, the target operator-specific performance impact representing a predicted change in the KPIs resulting from implementing the vehicle configuration in the target operator's fleet, wherein the unsupervised machine-learning model is configured to analyze the KPIs for estimating the target operator-specific performance impact associated with implementation of each of a plurality of different vehicle configurations and identify correlations between the vehicle configuration information and the target operator-specific performance impact without labeled training data, the plurality of different vehicle configurations corresponding to different hardware configurations of the vehicle including different powertrain configurations of the vehicle;

determine a vehicle configuration based on the estimated target operator-specific performance impact; and provide the vehicle configuration and the estimated target operator-specific performance impact to a client application.

2. The system of claim 1, wherein the metrics characteristic of the target operator's drive cycle include at least one of:

an average speed;

a maximum speed;

kinetic intensity;

trip distance;

vehicle class; and route.

3. The system of claim 1, wherein in analyzing the KPIs for estimating the target operator-specific performance impact associated with the implementation of the vehicle configuration, the system is configured to:

determine differences in values between the KPIs based on the telemetry data for the target operator and the KPIs based on the other operator telemetry data;

determine the values of the KPIs based on the telemetry data for the target operator are lower than the KPIs based on the other operator telemetry data according to a threshold value;

determine one or more vehicle configuration variables between a first vehicle configuration related to the telemetry data for the target operator and a second vehicle configuration related to the other operator telemetry data; and estimate the target operator-specific performance impact associated with implementing the one or more vehicle configuration variables in the first vehicle configuration.

4. The system of claim 3, wherein in determining the vehicle configuration, the system is configured to determine one or more vehicle configuration variables associated with the second vehicle configuration.

5. The system of claim 4, wherein in providing the vehicle configuration and the estimated target operator-specific performance impact, the system is configured to generate a user interface for display in a graphical user interface on a client computing device, the user interface including a visual representation of the vehicle configuration and the estimated target operator-specific performance impact.

6. The system of claim 4, wherein the one or more vehicle configuration variables include at least one of:

a vehicle model type;

a vehicle engine variant;

a vehicle hardware transmission variant;

a vehicle software transmission variant;

an axle ratio;

an aero-feature;

an advanced driver-assistance system feature;

a predictive cruise control feature;

an adaptive cruise control feature;

a cruise control feature; and idle reduction equipment.

7. The system of claim 1, wherein the KPIs include at least one of:

fuel economy;

software status;

uptime;

gradeability;

acceleration;

freight efficiency;

maintenance compliance; and performance measurements associated with a vehicle driver.

8. The system of claim 1, wherein in providing the vehicle configuration and the estimated target operator-specific performance impact, the system is configured to generate a user interface for display in a graphical user interface provided by the client application, the user interface including a visual representation of the vehicle configuration and the estimated target operator-specific performance impact.

9. The system of claim 1, wherein prior to obtaining the telemetry data for the target operator, the system is further configured to receive, from the client application, a request for the vehicle configuration.

10. The system of claim 1, wherein the unsupervised machine-learning model is configured to continuously update using information received from the target operator and the one or more other operators while results are displayed only in response to requests from the client application.

11. A method for providing a vehicle configuration, comprising:

obtaining telemetry data for a target operator, the telemetry data including metrics characteristic of the target operator's drive cycle across a fleet of vehicles associated with the target operator;

automatically mining a data source comprising aggregated telemetry data from a plurality of operators for other operator telemetry data, the other operator telemetry data including telemetry data for other operators having metrics within a threshold value of the metrics characteristic of the target operator's drive cycle, wherein the data source includes other operator telemetry data for a plurality of vehicle configurations for a plurality of drive cycles, and wherein mining the data source includes:

identifying operators across a plurality of geographic regions and drive cycle types;

filtering the telemetry data to identify operators having drive cycle characteristics matching the target operator within the threshold value; and extracting vehicle configuration data for vehicles operated by the identified operators;

determining key performance indicators (KPIs) based on the telemetry data for the target operator and the other operator telemetry data, the KPIs being indicative of overall operation of the fleet of vehicles of the target operator and comparative operation of one or more vehicles of the target operator relative to one or more other operators identified as similar to the target operator based on the other operator telemetry data;

using an unsupervised machine-learning model trained using the telemetry data and the other operator telemetry data including vehicle configuration information corresponding to different hardware configurations across the fleet of vehicles, analyze the KPIs for estimating a target operator-specific performance impact associated with an implementation of a vehicle configuration, the vehicle configuration including a plurality of configuration variables indicative of configuration variants of a vehicle, the target operator-specific performance impact representing a predicted change in the KPIs resulting from implementing the vehicle configuration in the target operator's fleet, wherein the unsupervised machine-learning model is configured to analyze the KPIs for estimating the target operator-specific performance impact associated with implementation of each of a plurality of different vehicle configurations and identify correlations between the vehicle configuration information and the target operator-specific performance impact without labeled training data, the plurality of different vehicle configurations corresponding to different hardware configurations of the vehicle including different powertrain configurations of the vehicle;

determining a vehicle configuration based on the estimated target operator-specific performance impact; and providing the vehicle configuration and the estimated target operator-specific performance impact to a client application.

12. The method of claim 11, wherein mining the data source for other operator telemetry data comprises mining a data source comprising other operator telemetry data for a plurality of vehicle configurations for a plurality of drive cycles.

13. The method of claim 11, wherein analyzing the KPIs for estimating the target operator-specific performance impact associated with the implementation of the vehicle configuration comprises:

determining differences in values between the KPIs based on the telemetry data for the target operator and the KPIs based on the other operator telemetry data;

determining the values of the KPIs based on the telemetry data for the target operator are lower than the KPIs based on the other operator telemetry data according to a threshold value;

determining one or more vehicle configuration variables between a first vehicle configuration related to the telemetry data for the target operator and a second vehicle configuration related to the other operator telemetry data; and estimating the target operator-specific performance impact associated with implementing the one or more vehicle configuration variables in the first vehicle configuration.

14. The method of claim 13, wherein determining the vehicle configuration comprises determining one or more vehicle configuration variables associated with the second vehicle configuration.

15. The method of claim 13, wherein providing the vehicle configuration and the estimated target operator-specific performance impact comprises generating a user interface for display in a graphical user interface provided by the client application, the user interface including a visual representation of the vehicle configuration and the estimated target operator-specific performance impact.

16. The method of claim 11, further comprising:

receiving a selection of the vehicle configuration; and automatically providing the selected vehicle configuration to a provisioning system to initiate manufacture of a vehicle based on the vehicle configuration.

17. A computer readable storage device configured to store computer readable instructions, which when executed by a processor, are configured to:

obtain telemetry data for a target operator, the telemetry data including metrics characteristic of the target operator's drive cycle across a fleet of vehicles associated with the target operator;

automatically mine a data source comprising aggregated telemetry data from a plurality of operators for other operator telemetry data, the other operator telemetry data including telemetry data for other operators having metrics within a threshold value of the metrics characteristic of the target operator's drive cycle, wherein the data source includes other operator telemetry data for a plurality of vehicle configurations for a plurality of drive cycles, and wherein mining the data source includes:

identifying operators across a plurality of geographic regions and drive cycle types;

filtering the telemetry data to identify operators having drive cycle characteristics matching the target operator within the threshold value; and extracting vehicle configuration data for vehicles operated by the identified operators;

determine key performance indicators (KPIs), based on the target operator's telemetry data and the other operator telemetry data, the KPIs being indicative of overall operation of the fleet of vehicles of the target operator and comparative operation of one or more vehicles of the target operator relative to one or more other operators identified as similar to the target operator based on the other operator telemetry data;

using an unsupervised machine-learning model trained using the telemetry data and the other operator telemetry data including vehicle configuration information corresponding to different hardware configurations across the fleet of vehicles, analyze the KPIs for estimating a target operator-specific performance impact associated with an implementation of a vehicle configuration, the vehicle configuration including a plurality of configuration variables indicative of configuration variants of a vehicle, the target operator-specific performance impact representing a predicted change in the KPIs resulting from implementing the vehicle configuration in the target operator's fleet, wherein the unsupervised machine-learning model is configured to analyze the KPIs for estimating the target operator-specific performance impact associated with implementation of each of a plurality of different vehicle configurations and identify correlations between the vehicle configuration information and the target operator-specific performance impact without labeled training data, the plurality of different vehicle configurations corresponding to different hardware configurations of the vehicle including different powertrain configurations of the vehicle;

determine a vehicle configuration based on the estimated target operator-specific performance impact; and provide the vehicle configuration and the estimated target operator-specific performance impact to a client application.

18. The computer readable storage device of claim 17, wherein in analyzing the KPIs for estimating the target operator-specific performance impact associated with the implementation of the vehicle configuration, the instructions are configured to:

determine differences in values between the KPIs based on the telemetry data for the target operator and the KPIs based on the other operator telemetry data;

determine the values of the KPIs based on the telemetry data for the target operator are lower than the KPIs based on the other operator telemetry data according to a threshold value;

determine one or more vehicle configuration variables between a first vehicle configuration related to the telemetry data for the target operator and a second vehicle configuration related to the other operator telemetry data; and estimate the target operator-specific performance impact associated with implementing the one or more vehicle configuration variables in the first vehicle configuration.

* * * * *